(No Model.) 3 Sheets—Sheet 1.

F. STARR.
COMBINED WASHBENCH AND IRONING TABLE.

No. 540,338. Patented June 4, 1895.

Witnesses
Thad H. Libby
A. M. Parkins

Inventor
Fred Starr
by Purnie & Goldsborough
Attorneys (No Model.) 3 Sheets—Sheet 2.

F. STARR.
COMBINED WASHBENCH AND IRONING TABLE.

No. 540,338. Patented June 4, 1895.

Witnesses
Chad H. Libby
A. M. Parkins

Inventor
Fred Starr
by Rennie Goldsborough
Attorneys (No Model.) 3 Sheets—Sheet 3.
F. STARR.
COMBINED WASHBENCH AND IRONING TABLE.
No. 540,338. Patented June 4, 1895.
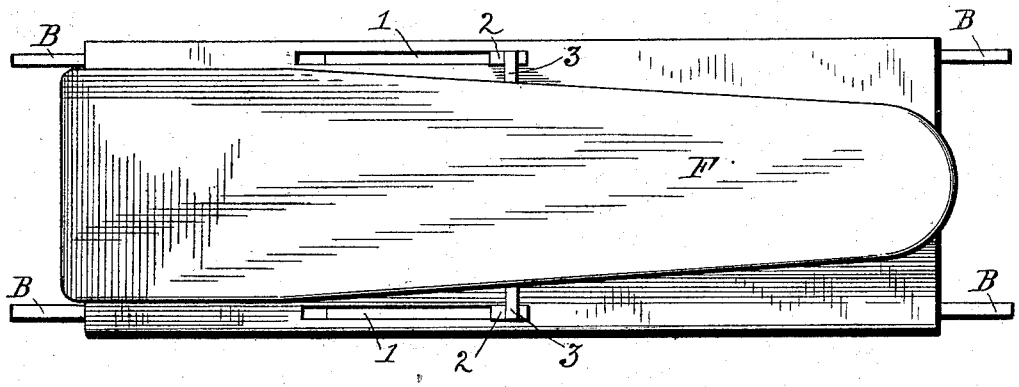
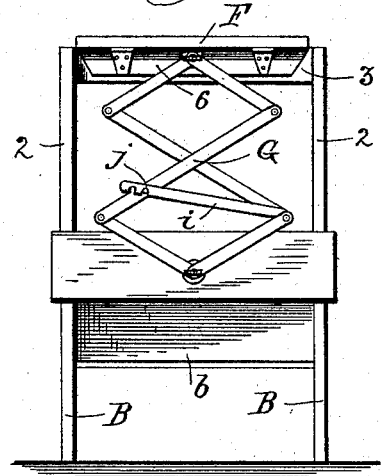
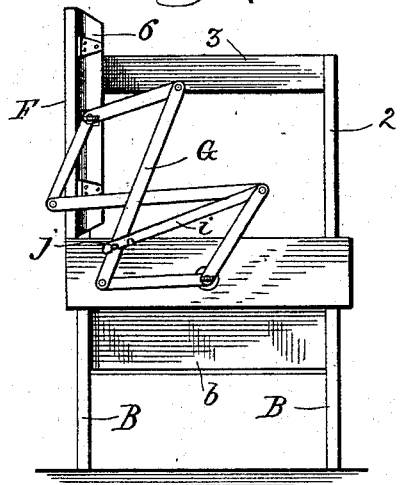
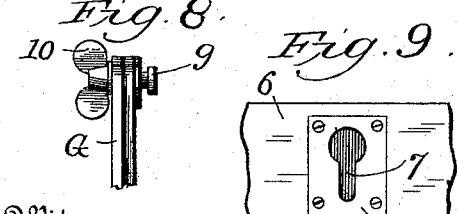
Witnesses
Thad H. Libby
A. M. Parkins
Inventor
Fred Starr
by
Rinier & Goldsborough
Attorneys.

UNITED STATES PATENT OFFICE.

FRED STARR, OF CHICAGO, ILLINOIS.

COMBINED WASHBENCH AND IRONING-TABLE.

SPECIFICATION forming part of Letters Patent No. 540,338, dated June 4, 1895.

Application filed September 15, 1894. Serial No. 523,083. (No model.)

*To all whom it may concern:*

Be it known that I, FRED STARR, a citizen of the United States, residing at Chicago, in the county of Cook and State of Illinois, have invented certain new and useful Improvements in a Combined Washbench and Ironing-Table; and I do hereby declare the following to be a full, clear, and exact description of the invention, such as will enable others skilled in the art to which it appertains to make and use the same.

My invention has reference generally to kitchen and laundry utensils, and relates more especially to certain new and useful improvements in combined wash-benches and ironing-tables.

The object of the invention is to provide a light, strong, and portable device of this character; one which may be readily folded into a small, compact space for storage or transportation, and which, when not required for use in the laundry, may be converted into a settee and used as an article of kitchen furniture. I obtain these and other objects by the construction and arrangement illustrated in the accompanying drawings, and set forth and described in the present specification.

Figure 1:
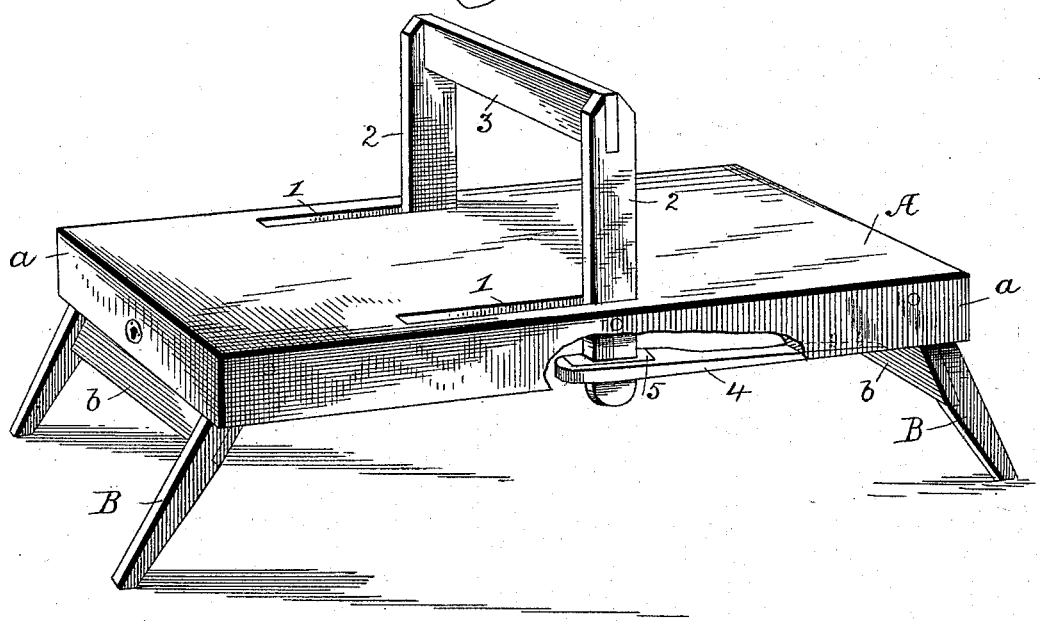
Figure 2:
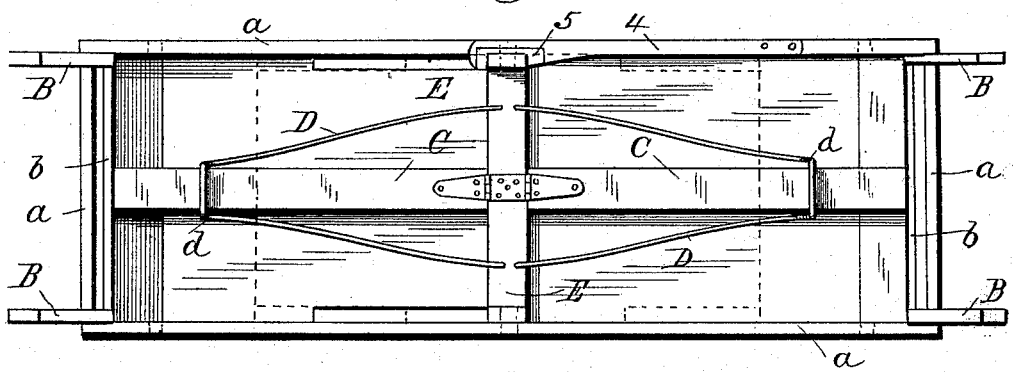
Figure 3:
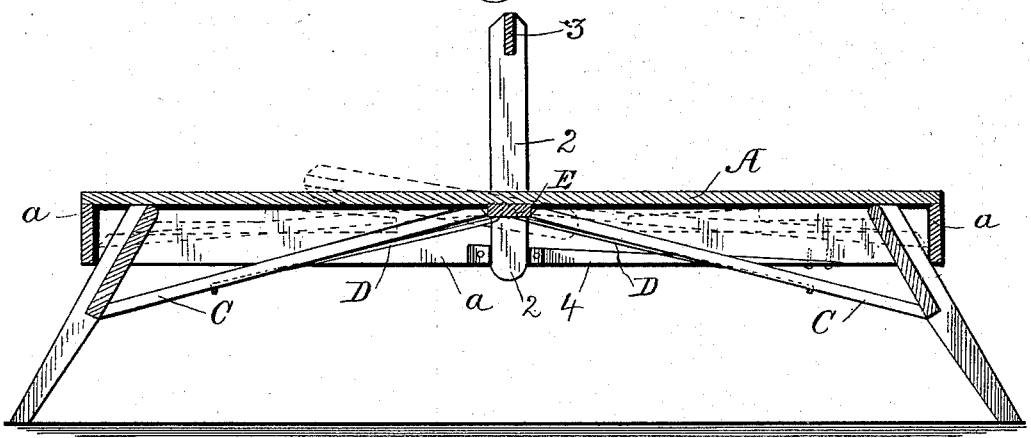
Figure 4:
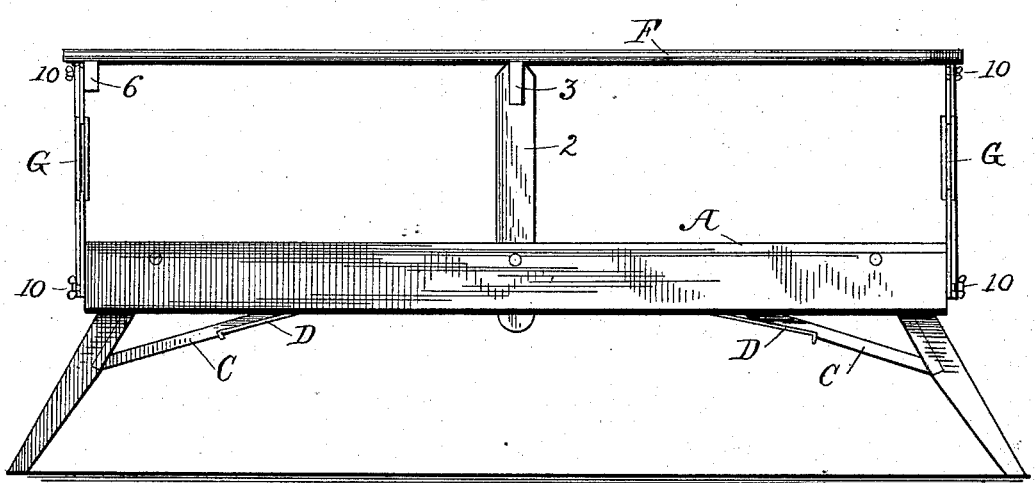

In the drawings, Figure 1 is a perspective view of the device adapted for use as a washbench. Fig. 2 is a bottom plan view of the same, showing the arrangement of springs and braces for holding the legs extended or folded and the spring-catch for holding the wringer-standards. Fig. 3 is a longitudinal vertical section of the bench. Fig. 4 is a side elevation of the device adapted for use as an ironing-board. Fig. 5 is a top plan view of the same. Fig. 6 is a rear end elevation showing the connection of the ironing-board with the washbench by lazy-tongs. Fig. 7 is a similar end elevation of the combined washbench and ironing-board adapted for use as a settee. Figs. 8 and 9 are detail views of the locking mechanism for detachably connecting the lazy-tongs levers with the rear end of the bench or the ironing-board, and Figs. 10 and 11 are similar views of the mechanism for detachably connecting the front end of the ironing-board to the lazy-tongs levers.

Corresponding parts in the several views are denoted by the same letters and figures of reference.

Referring more particularly to Figs. 1, 2 and 3, A denotes a flat table or stand which is preferably provided along the sides and across the ends with vertical depending flanges $a$, the object of these flanges being to form a shallow box-like receptacle on the under side of the table into which the pivoted legs with which the table is provided may be folded, and which contains the mechanism for holding the legs in either the folded or the extended position.

B, B, denote the legs. They are rigidly secured together in pairs by means of cross-pieces $b$, $b$, and by means of these cross-pieces, also, they are pivotally secured in the side flanges $a$, $a$, at the ends of the table so as to be turned outward as shown in full lines in all the figures, and folded inward as shown in dotted lines in Figs. 2 and 3. The pivot of the legs is preferably well up on the flange near the under side of the table, and the lower edge of the end flanges forms a stop against which the braces (to be presently described) hold the legs when extended.

C, C, are braces arranged centrally under the table and extending longitudinally outward toward the ends. These braces are pivotally connected at their inner ends to the table, or (and preferably) by means of strap hinges $c$, $c$, to a cross-piece secured to the under side of the table. The outer ends of these braces are preferably beveled off, as shown in Fig. 3, and bear against the inner side of the boards $b$, $b$, which connect the legs together in pairs.

D, D, are brace springs, consisting of rods of spring wire bent into bow-shape, as shown in Fig. 2, and secured at their inner ends to the same cross-piece to which the braces are pivoted. These springs extend outwardly and are bent around the braces, as shown at $d$, $d$, in Fig. 2, and serve to press the braces normally upward toward the under side of the table. When the legs are extended, as in Fig. 3, the springs hold the ends of the braces with a yielding pressure against the boards $b$, $b$, thus keeping the legs extended. By pressing downward slightly on the braces, the legs may be folded under the table, as shown in dotted lines in Figs. 2 and 3, and in this position the springs hold the braces against the outer side of the boards $b$, and keep the legs folded against the under side of the table.

1, 1, indicate slots cut through the table A and extending longitudinally along its side edges from a point near the center toward one end.

2, 2, indicate vertical standards having a cross-piece 3 at the top, which standards form the means of attachment and support for the wringer rolls in a manner well understood.

E is a cross-piece secured to the under side of the table, the ends of which cross-piece constitute pivots or trunnions upon which the wringer supporting standards are pivoted, as shown in Figs. 1 and 3. These standards work in the slots 1, 1, in the table, and are adapted to fold into the position shown in dotted lines in Fig. 3, or be held in vertical position by means of a spring catch 4, as shown in Figs. 1 and 2. This catch is preferably a wooden strip screwed or bolted to the edge of the side flange in a rabbet or cut-out portion of said flange, as indicated in Figs. 1, 2 and 3. A notched casting 5 is secured to the side of the front end of the catch in a position to receive the lower end of the standard 2, which snaps into the notch as the standard is raised into vertical position. The catch 4 yields laterally to permit the end of the standard to snap into the notch, or, being secured at one end only, and being formed of a long slender piece of wood, it may yield downwardly should the extreme end of the standard strike the top edge.

Referring now to Figs. 4 to 11, F indicates an ironing-board which may be of any preferred shape and construction. This ironing-board is connected to the bench proper so as to be raised and lowered and secured in vertical position, or so as to be tilted over sidewise into a vertically edgewise position, as shown in Fig. 7, by means of a set of lazy-tongs levers G, at each end of the bench. The rear end of the ironing-board is connected by ordinary strap hinges to a cross-piece 6, so that the front end of the board can be tilted up for the purpose of putting a shirt, skirt, or other tubular article of clothing over it to be ironed. The connection at the rear end of the board with the lazy-tongs is made through this cross-piece 6 through the intermediacy of a key-hole slot 7 formed in a metallic plate 8 set in the piece and a headed bolt or screw 9 at the upper end of the lazy-tongs levers, a thumb-nut 10 being provided on the outer end of the bolt 9 for the purpose of tightening up and securing the same when adjusted in proper position. The lower end of the set of lazy-tongs levers is secured to the end flange of the wash-bench proper by precisely the same means, and no further description thereof is necessary. The lazy-tongs levers at the front end of the bench are also secured by similar means, but the attachment of the ironing-board at this end to the levers is made directly to the board by means of a key-hole slot *e* in a plate *f* covering a recess *g* formed in the under side of the board into which fits the headed bolt or screw *h* projecting vertically from the upper end of the lazy-tongs levers, and which may also be provided with a thumb screw similar to that at the other end of the board, though this is not essential at this point.

When the standards 2, 2, are in the folded position indicated in Fig. 3, the ironing-board lies flat down near the surface of the table. The wash-bench, proper, is of the proper height to receive the tubs, and the ironing-board, of course, requires to be set at a greater elevation. When it is desired to arrange the board for ironing, the standards 2, 2, are raised into vertical position under the center of the board and form a firm support at that point, as shown in Fig. 4. The lazy-tongs levers open out into the position shown in Fig. 6, and are made rigid so as to form a rear end support by means of a latch *i* pivoted to one of the tongs levers, or its pivot, and engaging with a pin *j* secured to another of the tongs levers, or its pivot, so as to lock the levers in their extended position. The set of levers at the front end of the board are operated and secured in precisely the same manner.

Fig. 7 illustrates the adaptation of the combined wash-bench and ironing-board to form a settee. In order to convert the device into such an article of furniture, it is only necessary to loosen the thumb-screws at the front and rear ends of the board, and tilt the latter over sidewise until its side edge rests along the edge of the table A with the board in vertical position. By loosening the locking devices at the lower ends of the lazy-tongs, they are permitted to swing laterally into an inclined position as shown in Fig. 7, and by catching the pin *j* in one of the other notches in the latch-bar *i*, the levers are rigidly secured in position so as to hold the ends of the ironing board (which now constitutes the back of the settee) and form arms for the seat.

I do not wish to be understood as limiting myself to the precise details of construction herein illustrated and described, but reserve to myself the right to modify the same without departing from the spirit or scope of the invention.

Having thus described my invention, what I claim, and desire to secure by Letters Patent, is—

1. In a combined wash-bench and ironing table, the combination of the bench proper, and the ironing-board connected to the ends of the bench by lazy-tongs levers so as to be raised and lowered; substantially as described.

2. In a combined wash-bench and ironing table, the combination of the bench proper, the ironing board, lazy-tongs levers connecting said board with the bench at opposite ends, and a locking device for locking the levers and securing the board in an elevated position above the bench; substantially as described.

3. In a combined wash-bench and ironing table, the combination of the bench proper, the ironing-board, and lazy-tongs levers connecting said board with the bench at opposite ends, the connection being such that the board may be raised and lowered and tilted over sidewise; substantially as described.

4. In a combined wash-bench and ironing table, the combination of the bench proper, the ironing-board, lazy-tongs levers connecting said board with the bench at opposite ends, and a locking device for locking the levers and securing the board in an edge-wise vertically-tilted position; substantially as described.

5. In a combined wash-bench and ironing table, the combination of the bench proper, lazy-tongs levers connected at one end with the bench at opposite ends, a cross-piece carried by the upper end of the levers at one end of the bench, the ironing-board hinged at one end to said cross-piece, and a detachable connection between the other end of the board and the levers at the opposite end of the bench; substantially as described.

6. In a combined wash-bench and ironing table, the combination of the bench proper, lazy-tongs levers removably connected to the bench at opposite ends, an ironing-board detachably connected to the upper ends of said lazy-tongs levers, and releasable fastening devices for connecting said levers to the bench and the ironing board; substantially as described.

7. In a wash-bench, the combination of a table having longitudinal slots extending along its side, wringer-supporting standards pivoted transversely of the table and working in said slots, and a laterally yielding spring catch secured to the table on the under side or edge, said catch having a notch in its side into which the lower end of the wringer standard snaps when raised into vertical position; substantially as described.

8. In a combined wash-bench and ironing table, the combination of the bench proper, the lazy-tongs levers secured thereto at opposite ends, the ironing-board connected to the upper end of said levers, and the locking device for holding said levers in extended position; substantially as described.

9. In a combined wash-bench and ironing-table, the combination of the bench proper, the lazy-tongs levers pivotally secured thereto at opposite ends so as to swing laterally, the ironing board pivotally connected to the upper ends of said levers so as to turn over sidewise, and a locking device for holding the levers extended while in a laterally deflected position; substantially as described.

10. In a combined wash bench and ironing table, the combination of the bench proper, the wringer supporting standards pivoted thereon about centrally of the bench, the ironing board connected to the ends of the bench by lazy-tongs levers so as to be raised and lowered, and a spring catch for holding the standards in raised position so as to form a central support for the ironing board; substantially as described.

In testimony whereof I affix my signature in presence of two witnesses.

FRED STARR.

Witnesses:
J. A. GOLDSBOROUGH,
HUGH M. STERLING.